United States Patent
Anderson et al.

(10) Patent No.: US 9,551,830 B1
(45) Date of Patent: Jan. 24, 2017

(54) OPTICAL SYSTEM INCLUDING MULTIPLEXED VOLUME BRAGG GRATING, METHODS, AND APPLICATIONS

(71) Applicant: University of Central Florida Research Foundation, Inc., Orlando, FL (US)

(72) Inventors: Brian Anderson, Orlando, FL (US); Ivan Divliansky, Orlando, FL (US); Leonid Glebov, Orlando, FL (US); Daniel Ott, Washington, DC (US); Evan Hale, Orlando, FL (US); George Venus, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/838,744

(22) Filed: Aug. 28, 2015

(51) Int. Cl.
| | | |
|---|---|---|
| *G02B 6/34* | (2006.01) |
| *G02B 6/14* | (2006.01) |
| *G02B 5/18* | (2006.01) |
| *H01S 3/067* | (2006.01) |
| *H01S 3/00* | (2006.01) |
| *G02B 6/32* | (2006.01) |

(52) U.S. Cl.
CPC ............ *G02B 6/14* (2013.01); *G02B 5/1861* (2013.01); *G02B 5/1866* (2013.01); *G02B 6/32* (2013.01); *G02B 6/34* (2013.01); *H01S 3/005* (2013.01); *H01S 3/06754* (2013.01)

(58) Field of Classification Search
CPC .... H01S 3/005; H01S 3/06754; G02B 6/1886; G02B 6/1861; G02B 6/14
See application file for complete search history.

(56) References Cited

U.S. PATENT DOCUMENTS

| | | |
|---|---|---|
| 6,586,141 B1 | 7/2003 | Efimov et al. |
| 6,673,497 B2 | 1/2004 | Efimov et al. |
| 7,394,842 B2 | 7/2008 | Glebov et al. |
| 2005/0018743 A1* | 1/2005 | Volodin ............ G02B 27/0944 372/102 |

(Continued)

OTHER PUBLICATIONS

Ingersoll, G.B., and J.R. Leger, "Channel density and efficiency optimization of spectral beam combining systems based on volume Bragg gratings in sequential and multiplexed arrangements," Applied Optics, Optical Society of America, vol. 54, No. 20 (Jul. 20, 2015), pp. 6244-6253.*

(Continued)

*Primary Examiner* — Rhonda Peace
(74) *Attorney, Agent, or Firm* — Bond, Schoeneck & King, PLLC; William Greener

(57) ABSTRACT

A method of reversible spatial mode selection and conversion between waveguides and free space is presented using a multiplexed volume Bragg grating (MVBG). The MVBG has an inherent angular selectivity, providing different losses for different transverse modes and converting a higher order mode in waveguide to a single fundamental mode in free space. Using the device in a resonator allows for a pure higher order mode to be guided and amplified in the gain medium, to increase the mode area, to extract accumulated excitation more efficiently, and, therefore, to increase gain of the amplifier. In the same resonator, the device is able to convert the higher order mode to a high brightness Gaussian beam in free space or to a fundamental mode in a waveguide.

18 Claims, 3 Drawing Sheets

(56) References Cited

U.S. PATENT DOCUMENTS

2006/0221449 A1* 10/2006 Glebov ............... H01S 3/0057
359/575
2006/0256832 A1* 11/2006 Volodin ............. G02B 27/0944
372/102
2013/0208754 A1 8/2013 Glebov et al.

OTHER PUBLICATIONS

Kaim, Sergiy, et. al., "Saturation of multiplexed volume Bragg grating recording," Journal of Optical Society of America, vol. 32, No. 1 (Jan. 1, 2015), pp. 22-27.*
Ott, Daniel, et. al., "Scaling the spectral beam combining channels in a multiplexed volume Bragg grating," Optical Society of America, vol. 21, No. 24 (Nov. 22, 2013).*
L.B. Glebov, "Photochromic and photo-thermo-refractive (PTR) glasses," Encyclopedia of Smart Materials, John Wiley & Sons, NY, 770-780 (2002).
L.B. Glebov, Photosensitive holographic glass—new approach to creation of high power lasers, Phys. Chem. Glasses: Eur. J. Glass Sci. Technol. B, 48 (2007) 123-128.
L. Glebov, "High-performance solid-state and fiber lasers controlled by volume Bragg gratings," Rev. of Laser Eng. 41, 684-690 (2013).
B. Anderson, G. Venus, D. Ott, I. Divliansky, and L. Glebov, "Compact cavity design in solid state resonators by way of volume Bragg gratings," Proc. SPIE 8959, 89591H (2014).
B. Anderson, G. Venus, D. Ott, I. Divliansky, J.W. Dawson, D.R. Drachenberg, M.J. Messerly, P.H. Pax, J.B. Tassano, and L.B. Glebov, "Fundamental mode operation of a ribbon fiber laser by way of volume Bragg gratings," Opt. Lett. 39, 6498-6500 (2014).
G. Venus, L. Glebov, V. Rotar, Smirnov, P. Crump, and J. Farmer. Volume Bragg semiconductor lasers with near diffraction limited divergence. In Laser Source and System Technology for Defense and Security II, edited by Gary L. Wood, Mark A. Dubinskii, Proc. of SPIE 6216 (2006) 621602.
S. Mokhov, A. Jain, C. Spiegelberg, V. Smirnov, O. Andrusyak, G. Venus, B. Zeldovich, and L. Glebov, "Multiplexed Reflective Volumn Bragg Grating for Passive Coherent Beam Combining," Laser Sci. XXVI LWG2 (2010).
A. Jain, C. Spiegelberg, V. Smirnov, L. Glebov, and E. Bochove, "Efficient coherent beam combining of fiber lasers using multiplexed volume Bragg gratings," CLEO: Science and Innovations, OSA Technical Digest, CF2N.8 (2012).
C.A. Lu, A. Flores, E. Bochove, W. Roach, V. Smirnov, and L. Glebov, "Active coherent superposition of five fiber amplifiers at 670W using multiplexed volume Bragg gratings," Proceedings of SPIE 8601, 86011 (2013).
Marc SeGall, Vasile Rotar, Julien Lumeau, Sergiy Mokhov, Boris Zeldovich and Leonid B. Glebov. Binary volume phase masks in photo-thermo-refractive glass. Opt. Lett. 37 (2012) 190-192.

* cited by examiner

OPTICAL SYSTEM INCLUDING MULTIPLEXED VOLUME BRAGG GRATING, METHODS, AND APPLICATIONS

GOVERNMENT FUNDING

The invention was made with funding from the HEL JTO and Army Research Office under contract No. W911NF-10-1-0441. The U.S. government has certain rights in the invention.

TECHNICAL FIELD

Embodiments of the present invention relate generally to the field of optics; more particularly to optical systems employing multiplexed volume Bragg gratings (MVBGs); and most particularly to systems (e.g., laser resonators, optical amplifiers), methods, and applications enabling the reversible conversion between fundamental and higher order spatial modes of a propagating optical beam.

BACKGROUND

Volume Bragg gratings (VBG) are diffractive optical elements. They are typically holographically recorded by exposing a photo-sensitive material to a two-beam interference pattern, creating a spatial sinusoidal refractive index modulation. An incident wave that satisfies the Bragg condition will be diffracted at an angle determined by a grating vector and a wave vector of an incident beam. Detuning from the Bragg condition in either angle or wavelength will reduce the diffraction efficiency, meaning the element typically has narrow spectral and angular selectivity. In the past, these features have been useful for spectral beam combining, spectral narrowing of laser output, spectral filtering, and transverse mode selection in laser resonators.

Another important feature of these gratings is that several holographic elements can be recorded within the photosensitive material, forming a multiplexed volume Bragg grating (MVBG). By designing such a holographic element to diffract two incident beams of a specific wavelength, which are incident at different angles, along a shared path, each grating will interact with one another, allowing multiple incident wavefronts to coherently interact.

In the past, these multiplexed gratings have been used as elements to coherently combine multiple outputs from separate laser resonators, allowing for the mode area to be increased by a factor equal to the number of gratings recorded in the photosensitive material.

An example of a recording medium for VBGs is photo-thermo-refractive (PTR) glass, which is a photosensitive glass with a high laser damage threshold, low absorption, and wide transparency region, making it a suitable substrate for high power systems. This glass is photosensitive in the near UV spectral region and it is transparent from 350 to 2700 nm. Recording of MVBGs has previously been demonstrated, allowing for the design and construction of coherently combined fiber lasers.

Recording VBGs in PTR glass has enabled the design of narrow band spectral and angular filters. The use of angular filters as a transverse mode selecting element has been demonstrated in several types of resonators. In both solid state and fiber lasers, single transmission VBGs have been used to angularly filter the higher order modes, allowing only the fundamental mode to oscillate in the resonator, improving the beam quality and brightness of the laser. In diode lasers, a tilted VBG was used to provide feedback for one of the lobes of a higher order mode. For this system, only half of the two lobed far field profile is diffracted providing feedback while the second lobe is transmitted as the output power. Although a higher order mode oscillates within the resonator, a single, diffraction limited beam is output from the system.

Creation of MVBGs, and their use to coherently combine several lasers, has been demonstrated in several publications. In these systems, multiple laser sources interfere on a single optical element, and depending on the relative phasing between the sources can constructively interfere to produce a single diffraction limited beam. Each laser source is in phase with each other, and N gratings are required to combine N laser sources, increasing the mode area by N times.

Previous methods of mode conversion depend on the use of binary phase plates, which consist of a number of π phase discontinuities proportional to the mode number being converted to. Such an element, when placed in the near field image of the mode profile, will either correct the it phase discontinuities of the higher order mode to convert it to a fundamental mode, or will add a number phase discontinuities to a fundamental mode to convert it to a higher order mode. However, such elements: (1) have the distinct disadvantage of not providing angular selectivity, meaning they cannot be used as an angular filter in a resonator and (2) can be difficult to manufacture due to the strict requirements on the slope of the π phase discontinuity.

Previous methods of transverse mode selection using angularly selective elements force the fundamental mode to oscillate within the gain medium, improving beam divergence while reducing the mode area. A previous method of higher order mode selection using a tilted VBG could select a single higher order mode, but did not provide the mode conversion outside of the gain medium.

Previous applications of a MVBG to coherently combine several laser systems required N gratings to be recorded in a single optical element to increase the mode area N times. This requirement places serious constraints on the minimum thickness of the MVBG, increasing heating when used in a high power system.

The inventors have recognized the benefits and advantages of systems and methods enabling mode selection and conversion that would allow the mode area of a single laser to be increased without requiring more than two gratings to be recorded within a single optical element. It would be particularly advantageous to allow the mode area to increase as a function of the angular selectivity of each grating and the angular difference between the incident wavevectors, allowing the mode area to increase independently of the number of gratings recorded in the MVBG. Mode conversion with a MVBG has the advantage of either providing both mode selection and mode conversion in a resonator, or mode conversion in a passive system.

These and other objects, benefits, and advantages provided by the solutions enabled by the embodied invention will be described in detail below with reference to the accompanying figures and as set forth in the appended claims.

SUMMARY

Embodiments of the invention are systems, methods, and applications enabling the reversible conversion between fundamental and higher order spatial modes of a propagating optical beam.

An embodiment of the invention is a method for reversible conversion between fundamental and higher order spatial modes of a propagating optical beam. In an aspect, the method involves providing an optical system including a multimode waveguide supporting propagation of a plurality of spatial modes including a fundamental mode and higher-order modes, which said higher-order modes are characterized by two, optical far-field, angularly separated side lobes and by a divergence of each lobe; an imaging system characterized by a magnification coefficient; and a multiplexed volume Bragg grating (MVBG) comprising two (a, b) volume Bragg gratings (VBGs) characterized by an angle, $\delta\theta_{ab}$, between input Bragg angles of the two VBGs, coincidence of output beams' Bragg angles, and an angular selectivity, $\delta\theta_a$, $\delta\theta_b$, of each VBG; propagating a higher order mode beam in the waveguide; imaging an exit facet of the waveguide to the MVBG such that the directions of propagation of converging lobes of the higher order mode coincide with the respective Bragg angles of the VBGs, while the angular divergence of the lobes remains less than the angular selectivity, $\delta\theta_a$, $\delta\theta_b$, of each respective VBG; diffracting the two lobes of the higher-order mode beam in the same direction by the MVBG; and outputting a beam consisting of a fundamental mode. The embodied method may further be characterized by the following illustrative, exemplary, non-limiting aspects, features, or steps:

wherein the angular selectivity of the MVBG coincides with or exceeds the divergence of the highest order mode propagated in the waveguide;

wherein the optical system comprises an optical amplifier;

wherein the MVBG is a double transmitting VBG;

wherein the MVBG is a double reflecting VBG;

wherein the step of propagating the higher order mode beam in the waveguide further comprises generating at least some of all of the possible modes in the waveguide each characterized by corresponding two, optical far-field, angularly separated side lobes and by a divergence of each lobe in free space, further comprising imaging the exit facet of the waveguide to the MVBG such that the directions of propagation of converging lobes of one of the propagating higher order modes coincide with the respective Bragg angles of the VBGs, while angular divergence of the lobes remains less than the angular selectivity of each respective VBG; providing a feedback mirror disposed along an optical axis of the output beam; retroreflecting the fundamental mode output beam by the feedback mirror; diffracting the fundamental mode output beam by the MVBG in two directions coinciding with directions of propagation of the side lobes of the higher order mode in the imaging system; imaging the two side lobes to the front facet of the waveguide; and propagating a higher-order mode characterized by the two imaged side lobes in the multimode waveguide;

wherein the optical system comprises an optical resonator of a laser;

wherein the MVBG is a double transmitting VBG;

wherein the MVBG is a double reflecting VBG;

wherein the angular selectivity of the MVBG coincides with the divergence of the highest order mode propagated in the waveguide.

An embodiment of the invention is a method for reversible conversion between fundamental and several higher order spatial modes of a propagating optical beam. According to an aspect, the method includes providing an optical system including a multimode waveguide supporting propagation of a plurality of spatial modes including a fundamental mode and higher-order modes, which said higher-order modes are characterized by two, optical far-field, angularly separated side lobes and by a divergence of each lobe; an imaging system characterized by a magnification coefficient; and a MVBG comprising a plurality of pairs (two) of VBGs where each pair is characterized by an angle between input Bragg angles of the two VBGs, an angular selectivity of each VBG, and coincidence of all output beams' Bragg angles; propagating a plurality of higher order mode beams in the waveguide; imaging an exit facet of the waveguide to the MVBG such that the directions of propagation of converging lobes of each higher order mode coincide with the respective Bragg angles of the VBGs, while the angular divergence of the lobes remains less than the angular selectivity of each respective VBG; diffracting at least some of the plurality of pairs of the higher-order mode lobes in the same direction by the MVBG; and outputting a beam consisting of a fundamental mode. The embodied method may further be characterized by the following illustrative, exemplary, non-limiting aspects, features, or steps:

wherein the step of propagating the higher order mode beam in the waveguide further comprises generating at least some of all of the possible modes in the waveguide each of which characterized by corresponding two, optical far-field, angularly separated side lobes and by a divergence of each lobe in free space, further comprising imaging the exit facet of the waveguide to the MVBG such that the directions of propagation of converging lobes of at least some of the plurality of the propagating higher order modes coincide with the respective Bragg angles of the pairs of VBGs, while angular divergence of the lobes remains less than the angular selectivity of each respective VBG; providing a feedback mirror disposed along an optical axis of the output beam; retroreflecting the fundamental mode output beam by the feedback mirror; diffracting the fundamental mode output beam by the MVBG in the directions coinciding with directions of propagation of the side lobes of the selected higher order modes in the imaging system; imaging at least some of the plurality of the pairs of side lobes to the front facet of the waveguide; and propagating a selected number of higher-order modes characterized by the corresponding number of pairs of imaged side lobes in the multimode waveguide;

wherein the optical system comprises an optical resonator of a laser.

An embodiment of the invention is an optical system. According to an aspect, the system includes a multimode waveguide having an exit/entrance facet that supports propagation of a plurality of spatial modes including a fundamental mode and higher-order modes, wherein said higher-order modes are characterized by two, optical far-field, angularly separated side lobes and by a divergence of each lobe; an imaging system characterized by a magnification coefficient and disposed so as to image the exit facet of the multimode waveguide; and a multiplexed volume Bragg grating (MVBG) comprising two (a, b) volume Bragg gratings (VBGs) characterized by an angle, $\delta\theta_{ab}$, between input Bragg angles of the two VBGs, coincidence of output beams' Bragg angles, and an angular selectivity, $\delta\theta_a$, $\delta\theta_b$, of each VBG, disposed in an image plane of the imaging system, wherein: a) upon (i) propagating a higher order mode beam in the waveguide, (ii) imaging the exit facet of the waveguide to the MVBG such that the directions of propagation of converging lobes of the higher order mode coincide with the respective Bragg angles of the VBGs, while the angular divergence of the lobes remains less than the angular selectivity, $\delta\theta a$, $\delta\theta b$, of each respective VBG, and (iii) diffracting the two lobes of the higher-order mode beam in the same direction by the MVBG, a beam consisting of a fundamental mode is output from the system; or b) upon (i) inputting a beam consisting of a fundamental mode to the MVBG, (ii) diffracting the fundamental mode beam by the MVBG in two directions coinciding with directions of propagation of the side lobes of the higher order mode in the imaging system, and (iii) imaging the two side lobes to the entrance facet of the waveguide, a beam comprising at least one higher-order mode characterized by the two imaged side lobes is propagated in the multimode waveguide. The embodied optical system may further be characterized by the following illustrative, exemplary, non-limiting aspects, features, or limitations:

further comprising a feedback mirror disposed to reflect the output beam consisting of the fundamental mode back through the MVBG;

wherein the MVBG is a double transmitting VBG;

wherein the MVBG is a double reflecting VBG;

the optical system comprising an optical resonator of a laser.

Additional features and advantages of the invention will be set forth in the detailed description to follow, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which.

DETAILED DESCRIPTION OF NON-LIMITING, EXEMPLARY EMBODIMENTS OF THE INVENTION

Embodiments of the invention are systems, methods, and applications enabling the reversible conversion between fundamental and higher order spatial modes of a propagating optical beam.

Figure 1:
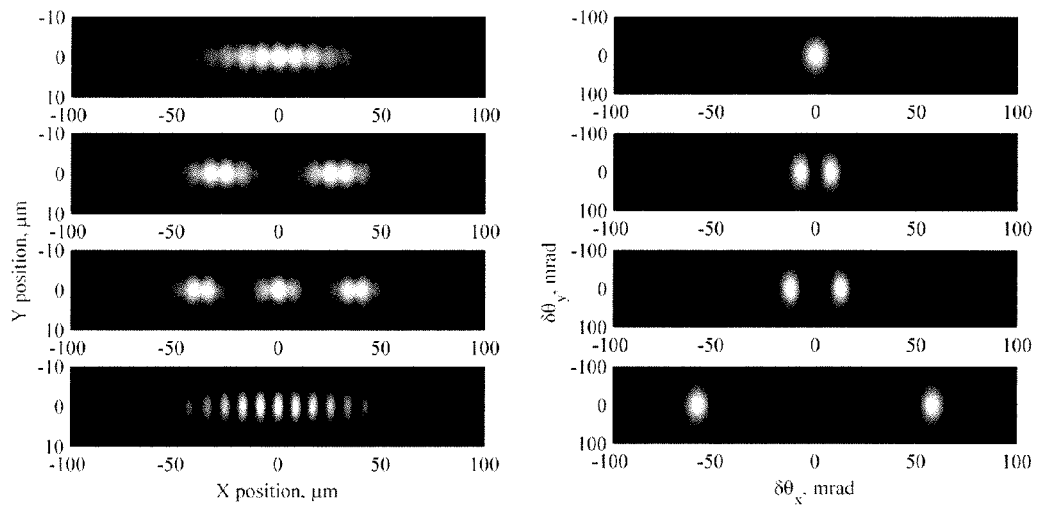
FIG. 1: (Left) Example near field profiles for the fundamental, first, second, and $12^{th}$ guided modes of a hypothetical slab waveguide; (Right) Example far field profiles of the same modes demonstrating the lobed appearance in the far field. The angular spacing between the two lobes is proportional to the number of phase discontinuities in the near field.

For either a slab waveguide or a slab resonator, a number of transverse modes are capable of being guided along the wide (slow) axis, while the narrow (fast) axis could be designed to allow only the fundamental mode to be guided. The near fields of these higher order modes consist of a number of $\pi$ phase discontinuities, causing the spatial intensity profile to modulate between 0 and the maximum intensity of the beam (FIG. 1). One can see that higher order modes occupy large areas. Therefore, for the same total power they provide lower power density in the waveguide and in case of amplification enable higher extraction of accumulated excitation. The angular content of these transverse modes, i.e., the far field profile, shows that they have two distinct, high intensity lobes containing a large fraction of the total energy within the mode. In this sense, these higher order modes can be thought of as two distinct, in-phase beams propagating along slightly inclined propagation vectors, forming a two beam interference pattern in the near field. The angular separation of these two lobes is controlled by the number of phase discontinuities present in the near field profile (the mode number), while the angular size of each lobe is controlled by the diffraction at the exit aperture of the waveguide. This means that while higher order modes provide larger mode areas, high divergence of the propagating beam dramatically decreases brightness compared to that for a fundamental mode.

Figure 2:
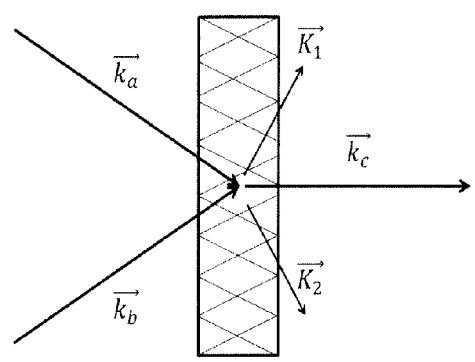
FIG. 2: Illustration of a multiplexed volume Bragg grating used for higher order mode conversion, according to an embodiment of the invention. $\vec{k}_a$, $\vec{k}_b$—wavevectors of the incident beams, $\vec{K}_1$, $\vec{K}_2$—multiplexed VBG grating vectors, $\vec{k}_c$—wavevector of the diffracted beam.

As illustrated in FIG. 2, a multiplexed volume Bragg grating (MVBG) consists of two volume Bragg gratings recorded in the same volume of a photosensitive material and aligned to coherently combine two beams in the single one. Because side lobes of a high order mode are coherent, a pure higher order mode can be converted to a fundamental mode. In this illustration, the Bragg vector of each grating ($K_1$, $K_2$) is aligned such that the incident wavevectors of each far field lobe of the higher order mode ($k_a$, $k_b$) are aligned to satisfy the Bragg conditions of the MVBG. During diffraction through the VBGs, each lobe travels an equivalent path length, and they are in phase, meaning they coherently interfere to produce a single beam propagating along $k_c$. In this manner a higher order mode has been converted to a fundamental mode. By reversing propagation, the multiplexed VBG can be used to convert a fundamental mode beam into a pure higher order mode. For a beam incident along the wavevector $k_c$, the beam is split with 50% of the power traveling along the $k_a$ and $k_b$ wavevectors. The far field of this beam will have the characteristic two lobe profile, while the near field will show a two beam interference pattern typical for the near field profile of a higher order mode.

$$k_a - K_1 = k_c \quad (1)$$

$$k_b - K_2 = k_c \quad (2)$$

The volume Bragg grating naturally has angular selectivity due to the long interaction length with an incident beam. For an incident wave detuned from the Bragg condition, that wave will have reduced diffraction efficiency (higher diffraction losses). For a beam with angular content larger than the angular selectivity of the VBG, the diffraction efficiency will be reduced. For a single VBG, this angular selectivity can be matched to the fundamental mode of a laser resonator to provide feedback only for the fundamental mode, improving the beam quality and enhancing the brightness of the output from the laser resonator. For a MVBG, the angular selectivity of each grating can be matched to the divergence of one lobe of the higher order mode. Only a single higher order mode, whose lobes each have a divergence within the angular selectivity of each VBG, and whose lobes diverge with an angle separation equal to the angle between the $k_a$ and $k_b$, will be diffracted with high efficiency. All other modes will have increased losses and will not oscillate.

Figure 3:
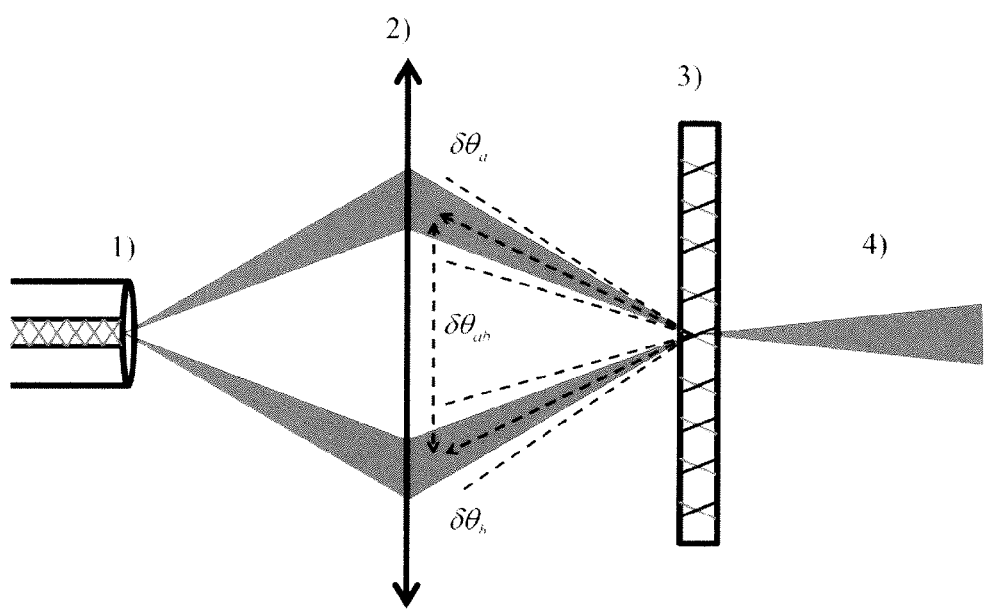
FIG. 3: Higher order mode (HOM) conversion using a MVBG, including 1) waveguide with higher order mode propagating within, 2) re-imaging system, 3) MVBG with angular selectivity of $\delta\theta_a$ matched to the divergence of each lobe of the HOM and $\delta\theta_{ab}$ equal to the angle between the two lobes of the HOM, 4) the HOM converted to a fundamental mode, according to an illustrative embodiment of the invention.

Experimentally, mode conversion using a MVBG was demonstrated in the setup shown in FIG. 3. The MVBG was designed such that: 1) the angular selectivity ($\delta\theta_a$, $\delta\theta_b$) of the individual gratings was wider than the angular divergence of each lobe of the higher order mode, and 2) the angle between the two incident wavevectors, which satisfy the Bragg condition ($\delta\theta_{ab}$) was equal to the angular separation between the two far field lobes of the higher order mode. In the experiment: (1) a pure higher order mode propagated through a slab-like waveguide, (2) a lens system was used to reimage the mode onto the MVBG, (3) the both lobes of the higher order mode were diffracted by the MVBG, (4) a single lobed beam with diffraction limited divergence was found to propagate from the MVBG.

The reverse experiment was also performed, where: (1) a Gaussian beam with high beam quality was reimaged on the MVBG, (2) the MVBG split the beam into two beams, each with angular divergence equal to that of the fundamental mode and angular separations equal to that of the lobes of the higher order mode in the imaging system, (3) the two beams were reimaged to the front facet of the waveguide, (4) the near field profile was measured to have the modulations of that associated with a higher order mode.

The imaging systems used for these experiments could have different magnification coefficients to provide matching of the angular selectivity and the angular separation of the two gratings with angular divergences and angles between the side lobes of the higher order mode.

While the MVBG is not a new creation, in the embodied method a MVBG with two gratings can be used to increase the mode area in a waveguide while keeping divergence of the emitted beam at the level of a fundamental mode. Larger mode areas can be obtained by adjusting the inclination between VBGs and the angular selectivity for each grating with corresponding parameters of higher order modes.

The embodied method of mode conversion using a MVBG could be used to convert a fundamental mode to a higher order mode of a waveguide; this higher order mode could be amplified by the waveguide and a second MVBG could be used to convert the higher order mode to a high brightness Gaussian beam in free space or to the fundamental mode in a waveguide.

Using the angular selectivity of the MVBG, this element could be used as a transverse mode selecting element in a resonator, filtering all transverse modes except one higher order mode that is allowed to oscillate within the gain medium of the resonator, and converting the higher order mode to a high brightness fundamental mode outside the gain medium.

Figure 4:
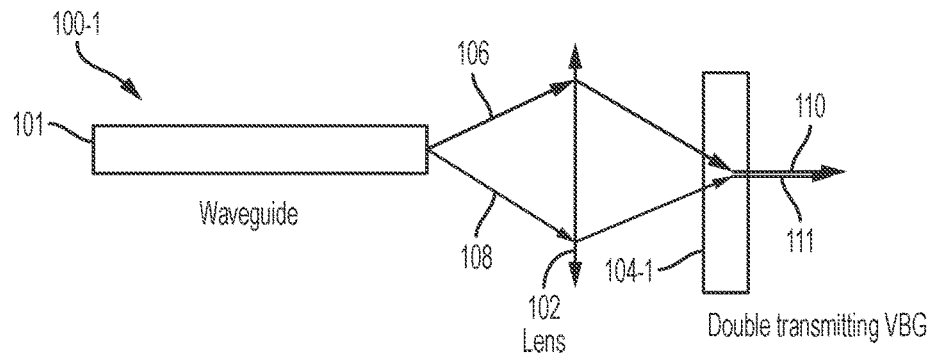
FIG. 4 is a schematic line drawing of an embodied optical system including a double transmitting MVBG according to an exemplary embodiment of the invention.

FIG. 4 is a schematic line drawing of an embodied optical system 100-1 including a multimode waveguide 101 supporting propagation of a plurality of spatial modes including a fundamental mode and higher-order modes, which said higher-order modes are characterized by two, optical far-field, angularly separated side lobes (106, 108) and by a divergence of each lobe; an imaging system 102 characterized by a magnification coefficient; and a double transmitting MVBG 104-1 comprising two (a, b; not shown) volume Bragg gratings (VBGs) characterized by an angle, $\delta\theta_{ab}$ (see FIG. 3), between input Bragg angles of the two VBGs, coincidence of output beams' Bragg angles (110), and an angular selectivity, $\delta\theta_a$, $\delta\theta_b$, of each VBG for the two far-field lobes 106, 108 of a propagating higher order mode, which is reversibly converted to a beam 111 consisting of a fundamental mode.

Figure 5:
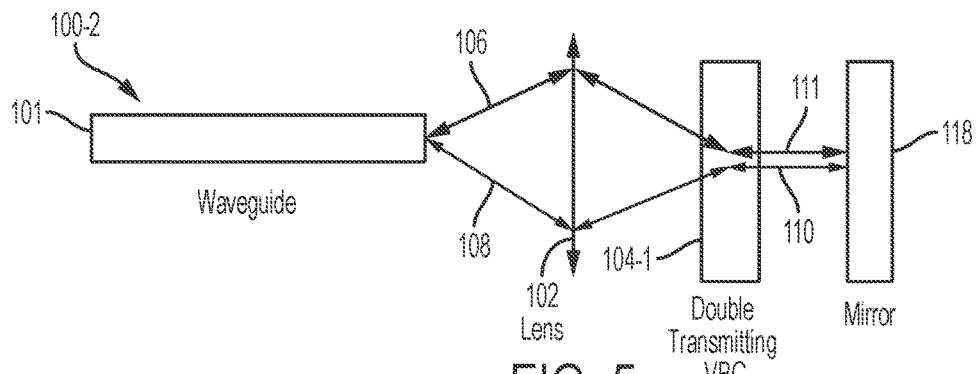
FIG. 5 is a schematic line drawing of an embodied optical system including a double transmitting MVBG and a feedback mirror, comprising an optical resonator according to an exemplary embodiment of the invention.

FIG. 5 is a schematic line drawing of an embodied optical system 100-2 comprising an optical resonator of a laser. In the illustrated embodiment a feedback mirror 118 is disposed along an optical axis of the fundamental mode output beam 111. The fundamental mode output beam 111 is retro-reflected by the feedback mirror into the MVBG 104, diffracted by the MVBG in the directions coinciding with directions of propagation of the side lobes of the selected higher order mode 106, 108 in the imaging system 102, imaged to the front facet of the waveguide, and only this selected higher-order mode is excited and propagated in the multimode waveguide.

Figure 6:
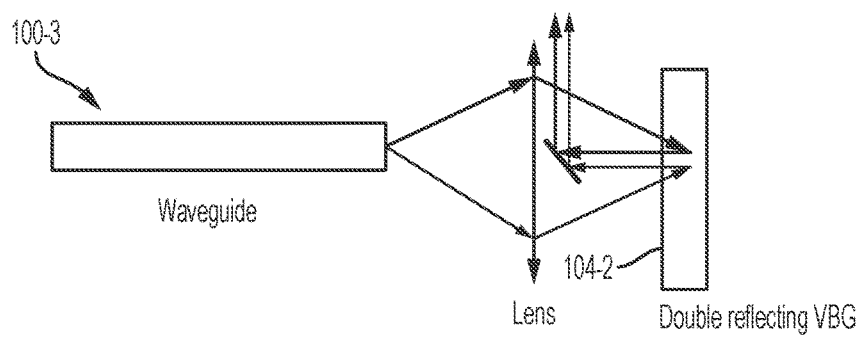
FIG. 6 is a schematic line drawing of an embodied optical system including a double reflecting MVBG according to an exemplary embodiment of the invention.

FIG. 6 is a schematic line drawing of an embodied optical system 100-3 that is similar to the optical system 100-1 shown in FIG. 4, except that a double reflecting MVBG 104-2 has replaced the double transmitting MVBG 104-1 and a folding mirror 119 is added to extract the diffracted beam for the imaging system.

Figure 7:
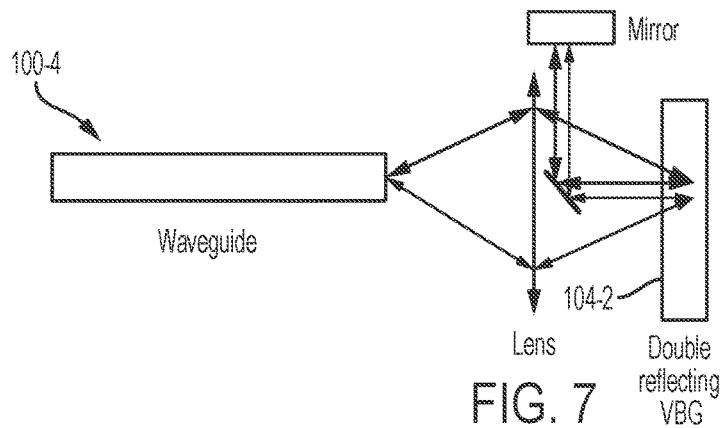
FIG. 7 is a schematic line drawing of an embodied optical system including a double reflecting MVBG and a feedback mirror, comprising an optical resonator according to an exemplary embodiment of the invention.

FIG. 7 is a schematic line drawing of an embodied optical system 100-4 that is similar to the optical system 100-2 shown in FIG. 5, except that a double reflecting MVBG 104-2 has replaced the double transmitting MVBG 104-1 and a folding mirror 119 is added to direct the diffracted beam to the feedback mirror.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A method for reversible conversion between fundamental and higher order spatial modes of a propagating optical beam, comprising:
    providing an optical system including:
        a multimode waveguide supporting propagation of a plurality of spatial modes including a fundamental mode and higher-order modes, which said higher-order modes are characterized by two, optical far-field, angularly separated side lobes and by a divergence of each lobe;
        an imaging system characterized by a magnification coefficient; and
        a multiplexed volume Bragg grating (MVBG) comprising two (a, b) volume Bragg gratings (VBGs) characterized by an angle, $\delta\theta_{ab}$, between input Bragg angles of the two VBGs, coincidence of output beams' Bragg angles, and an angular selectivity, $\delta\theta_a$, $\delta\theta_b$, of each VBG;
    propagating a higher order mode beam in the waveguide;
    imaging an exit facet of the waveguide to the MVBG such that the directions of propagation of converging lobes of the higher order mode coincide with the respective Bragg angles of the VBGs, while the angular divergence of the lobes remains less than the angular selectivity, $\delta\theta_a$, $\delta\theta_b$, of each respective VBG;
    diffracting the two lobes of the higher-order mode beam in the same direction by the MVBG; and
    outputting a beam consisting of a fundamental mode.

2. The method of claim 1, wherein the angular selectivity of the MVBG coincides with or exceeds the divergence of the lobes of the highest order mode imaged to the MVBG.

3. The method of claim 1, wherein the waveguide comprises an optical amplifier.

4. The method of claim 1, wherein the MVBG is a double transmitting VBG.

5. The method of claim 1, wherein the MVBG is a double reflecting VBG.

6. The method of claim 1, wherein the step of propagating the higher order mode beam in the waveguide further comprises generating at least some of all of the possible modes in the waveguide each characterized by corresponding two, optical far-field, angularly separated side lobes and by a divergence of each lobe in free space, further comprising:
    imaging the exit facet of the waveguide to the MVBG such that the directions of propagation of converging lobes of one of the propagating higher order modes coincide with the respective Bragg angles of the VBGs, while angular divergence of the lobes remains less than the angular selectivity of each respective VBG;
    providing a feedback mirror disposed along an optical axis of the output beam;
    retroreflecting the fundamental mode output beam by the feedback mirror;
    diffracting the fundamental mode output beam by the MVBG in two directions coinciding with directions of propagation of the side lobes of the previously selected higher order mode in the imaging system;
    imaging the two side lobes to the front facet of the waveguide; and
    propagating the only selected higher-order mode in the multimode waveguide.

7. The method of claim 6, wherein the optical system comprises an optical resonator of a laser.

8. The method of claim 6, wherein the MVBG is a double transmitting VBG.

9. The method of claim 6, wherein the MVBG is a double reflecting VBG.

10. The method of claim 6, wherein the angular selectivity of the MVBG coincides with or exceeds the divergence of the lobes of the highest order mode in the imaging system.

11. A method for reversible conversion between fundamental and several higher order spatial modes of a propagating optical beam, comprising:
    providing an optical system including:
        a multimode waveguide supporting propagation of a plurality of spatial modes including a fundamental mode and higher-order modes, which said higher-order modes are characterized by two, optical far-field, angularly separated side lobes and by a divergence of each lobe;
        an imaging system characterized by a magnification coefficient; and
        a MVBG comprising a plurality of pairs (two) of VBGs where each pair is characterized by an angle between input Bragg angles of the two VBGs, an angular selectivity of each VBG, and coincidence of all output beams' Bragg angles;
    propagating a plurality of coherent higher order mode beams in the waveguide;
    imaging an exit facet of the waveguide to the MVBG such that the directions of propagation of converging lobes of each higher order mode coincide with the respective Bragg angles of the VBGs, while the angular divergence of the lobes remains less than the angular selectivity of each respective VBG;
    diffracting at least some of the plurality of pairs of the higher-order mode lobes in the same direction by the MVBG; and
    coherently combining higher order modes to a single outputting a beam consisting of a fundamental mode.

12. The method of claim 11, wherein the step of propagating the higher order mode beam in the waveguide further comprises generating at least some of all of the possible modes in the waveguide each of which characterized by corresponding two, optical far-field, angularly separated side lobes and by a divergence of each lobe in free space, further comprising:

imaging the exit facet of the waveguide to the MVBG such that the directions of propagation of converging lobes of at least some of the plurality of the propagating higher order modes coincide with the respective Bragg angles of the pairs of VBGs, while angular divergence of the lobes remains less than the angular selectivity of each respective VBG;

providing a feedback mirror disposed along an optical axis of the output beam;

retroreflecting the fundamental mode output beam by the feedback mirror;

diffracting the fundamental mode output beam by the MVBG in the directions coinciding with directions of propagation of the side lobes of the selected higher order modes in the imaging system;

imaging at least some of the plurality of the pairs of side lobes to the front facet of the waveguide; and propagating a selected number of higher-order modes in the multimode waveguide.

13. The method of claim 12, wherein the optical system comprises an optical resonator of a laser.

14. An optical system, comprising:

a multimode waveguide having an exit/entrance facet that supports propagation of a plurality of spatial modes including a fundamental mode and higher-order modes, wherein said higher-order modes are characterized by two, optical far-field, angularly separated side lobes and by a divergence of each lobe;

an imaging system characterized by a magnification coefficient and disposed so as to image the exit facet of the multimode waveguide; and a multiplexed volume Bragg grating (MVBG) comprising two (a, b) volume Bragg gratings (VBGs) characterized by an angle, $\delta\theta_{ab}$, between input Bragg angles of the two VBGs, coincidence of output beams' Bragg angles, and an angular selectivity, $\delta\theta_a$, $\delta\theta_b$, of each VBG, disposed in an image plane of the imaging system, wherein:

a) upon (i) propagating a higher order mode beam in the waveguide, (ii) imaging the exit facet of the waveguide to the MVBG such that the directions of propagation of converging lobes of the higher order mode coincide with the respective Bragg angles of the VBGs, while the angular divergence of the lobes remains less than the angular selectivity, $\delta\theta_a$, $\delta\theta_b$, of each respective VBG, and (iii) diffracting the two lobes of the higher-order mode beam in the same direction by the MVBG, a beam consisting of a fundamental mode is output from the system; or b) upon (i) inputting a beam consisting of a fundamental mode to the MVBG, (ii) diffracting the fundamental mode beam by the MVBG in two directions coinciding with directions of propagation of the side lobes of the higher order mode in the imaging system, and (iii) imaging the two side lobes to the entrance facet of the waveguide, a beam comprising at least one higher-order mode characterized by the two imaged side lobes is propagated in the multimode waveguide.

15. The optical system of claim 14, further comprising a feedback mirror disposed to reflect the output beam consisting of the fundamental mode back through the MVBG.

16. The optical system of claim 14, wherein the MVBG is a double transmitting VBG.

17. The optical system of claim 14, wherein the MVBG is a double reflecting VBG.

18. The optical system of claim 14, comprising an optical resonator of a laser.

* * * * *